(12) United States Patent
Liu et al.

(10) Patent No.: US 8,150,936 B2
(45) Date of Patent: Apr. 3, 2012

(54) METHODS AND APPARATUS TO MANAGE SHADOW COPY PROVIDERS

(75) Inventors: Wei Liu, Bellevue, WA (US); Sanjay Jain, Northborough, MA (US)

(73) Assignee: EMC Corporation, Hopkinton, MA (US)

(*) Notice: Subject to any disclaimer, the term of this patent is extended or adjusted under 35 U.S.C. 154(b) by 1487 days.

(21) Appl. No.: 11/343,012

(22) Filed: Jan. 30, 2006

(65) Prior Publication Data

US 2007/0179980 A1 Aug. 2, 2007

(51) Int. Cl.
*G06F 17/30* (2006.01)

(52) U.S. Cl. .......................... 709/213; 711/162

(58) Field of Classification Search .............. None
See application file for complete search history.

(56) References Cited

U.S. PATENT DOCUMENTS

| | | | |
|---|---|---|---|
| 6,708,227 B1 | 3/2004 | Cabrera et al. | |
| 6,741,112 B2 | 5/2004 | Ajit | |
| 7,251,713 B1* | 7/2007 | Zhang | 711/162 |
| 2003/0188116 A1* | 10/2003 | Suzuki et al. | 711/162 |
| 2004/0250033 A1* | 12/2004 | Prahlad et al. | 711/162 |
| 2004/0254936 A1 | 12/2004 | Mohamed | |
| 2005/0004979 A1* | 1/2005 | Berkowitz et al. | 709/203 |
| 2005/0028026 A1 | 2/2005 | Shirley et al. | |
| 2005/0228832 A1 | 10/2005 | Ghotge et al. | |

OTHER PUBLICATIONS

Windows Storage Services Adoption and Futures, Keith Hagerman, Mar.-Apr. 2003, pp. 1-55.
VSS_Object_Prop Structure [VSS] Sep. 2005 1 page (downloaded from Internet Dec. 8, 2005).
Volume Shadow Copy API Structures, Sep. 2005 1 page (downloaded from internet Dec. 8, 2005).
Platform SDK: Volume Shadow Copy Service, Sep. 2005 1 page (downloaded from Internet Dec. 8, 2005).
Platform SDK Volume Shadow Copy Service, Sep. 2005, pp. 1-2, (downloaded from Internet Dec. 8, 2005).
Platform SDK Volume Shadow Copy Service, The VSS Model, Sep. 2005, 1 page, (downloaded from internet Dec. 8, 2005).
Platform SDK: Volume Shadow Copy Service, Volume Shadow Copy Service, 2005, 1 page, (downloaded from internet Nov. 22, 2005).
Ananda Sankaran, Kevin Guinn, Dat Nguyen, Volume Shadow Copy Service, Mar. 2004, pp. 14-18.

* cited by examiner

*Primary Examiner* — Kim Nguyen
(74) *Attorney, Agent, or Firm* — Daly, Crowley, Mofford & Durkee, LLP (57) ABSTRACT

A data storage management system includes a virtual provider for interacting with a coordinator to receive shadow copy requests from a requestor and for interfacing with a plurality of providers that support various logical units on which data volumes can be stored. The virtual provider appears to the coordinator as a provider and can generate a shadow copy of a first one of the data volumes that spans multiple ones of the logical units, which are supported by different ones of the plurality of providers.

20 Claims, 7 Drawing Sheets

METHODS AND APPARATUS TO MANAGE SHADOW COPY PROVIDERS

CROSS REFERENCE TO RELATED APPLICATIONS

Not Applicable.

STATEMENT REGARDING FEDERALLY SPONSORED RESEARCH

Not Applicable.

BACKGROUND

As is known in the art, conventional applications and services enable data storage systems to provide point-in-time replicas or shadow copies of a data volume, which can be stored on logical units (LUNs). Such applications can enable a user to recover an earlier version of a file, for example. U.S. Patent Publication No. US 2005/0228832 to Ghotge et al., U.S. Patent Publication No. US 2005/0028026 to Shirley et al., and U.S. Pat. No. 6,708,227 to Cabrera et al., all of which are incorporated herein by reference, disclose shadow copy systems.

BRIEF DESCRIPTION OF THE DRAWINGS

The exemplary embodiments contained herein will be more fully understood from the following detailed description taken in conjunction with the accompanying drawings, in which.

DETAILED DESCRIPTION

Exemplary embodiments described herein provide a data storage management system including shadow copy functionality with a virtual provider that overcomes certain limitations of known systems. With this arrangement, a copy coordinator is decoupled from providers that support various logical units to enhance the shadow copy functionality. While the various embodiments are primarily shown and described in conjunction with the volume shadow copy service of the WINDOWS SERVER 2003 platform by MICROSOFT corporation, it is understood that the embodiments are applicable to applications and systems in general in which it is desirable to create and manage replicas of data volumes.

Before describing exemplary embodiments in detail, some introductory material is presented. One platform that provides shadow copy capability is Microsoft Server 2003, by Microsoft Corporation of Redmond, Wash., which includes a Volume Shadow Copy Service (VSS) and Virtual Disk Service (VDS) API (Application Programming Interface). These technologies provide enhanced backup and recovery of data and improved storage visibility and management on the Microsoft Windows platform, as compared with previous systems.

The Volume Shadow Copy Service (VSS) enables fast backup and recovery of system states and applications by coordinating with other components to generate consistent point-in-time copies, which are referred to as shadow copies, of the production data while the applications are online. While some copy services, such as VSS, support shadow copy functionality, existing services have certain shortcomings. For example, a volume can include more than one LUN. In known copy services, a shadow copy of the volume cannot be taken with a given provider if all LUNs underneath the volume are not supported by the provider. For example, a volume can be located on five LUNs, where provider A supports the first four LUNs, and provider B supports a fifth LUN. A shadow copy of the volume cannot be taken using provider A, provider B, or the combination of providers A and B since the volume spans multiple LUNs having different providers.

In addition, a coordinator may process the first four LUNs before discovering that provider A does not work because of the fifth LUN, which is supported by provider B. Then the coordinator must search for another provider and the whole process plays over again. The coordinator may end up using an inferior provider for the volume, resulting in degraded performance or functionality. Or the coordinator may determine that a shadow copy of this volume cannot be taken.

While one may require a user to ensure that all LUNs in a volume are supported by the same hardware or software provider, this is an undesirable burden on the user. It is preferable that a user not need to keep track of which LUN is supported by which provider.

Further, there often exist multiple hardware providers each of which is capable of supporting a given set of LUNs. However, the coordinator behavior may be undefined in selecting a hardware provider in such a situation. The unpredictable nature of the provider selection can lead to erratic performance and functionality.

When more than one hardware provider can support a given set of LUNs, the coordinator may not have the ability to manage, differentiate, and/or effectively use those providers. Suppose two hardware providers A, B are both able to support a set of LUNs that make up a volume. Provider A has additional functionality, but is slower, while provider B has better performance. Because of strict timing requirements, for example, shadow copies taken using provider A may have a statistically higher failure rate than copies taken using provider B. However, the coordinator cannot make the best use of either provider. For example, it will not favor provider B to improve the success rate, even if the additional functionality is not needed.

In addition, in known copy applications the framework mandates that providers must respond to every requestor, i.e., the component that initiates the shadow copy process. However, there may exist some providers, such as so-called private or protected providers, having superior performance and functionality, that only respond to a predefined set of requesters. The enforcement of such a framework mandate would deem those providers unqualified and unusable, and therefore, would waste development time and investment in such providers.

Figure 1:
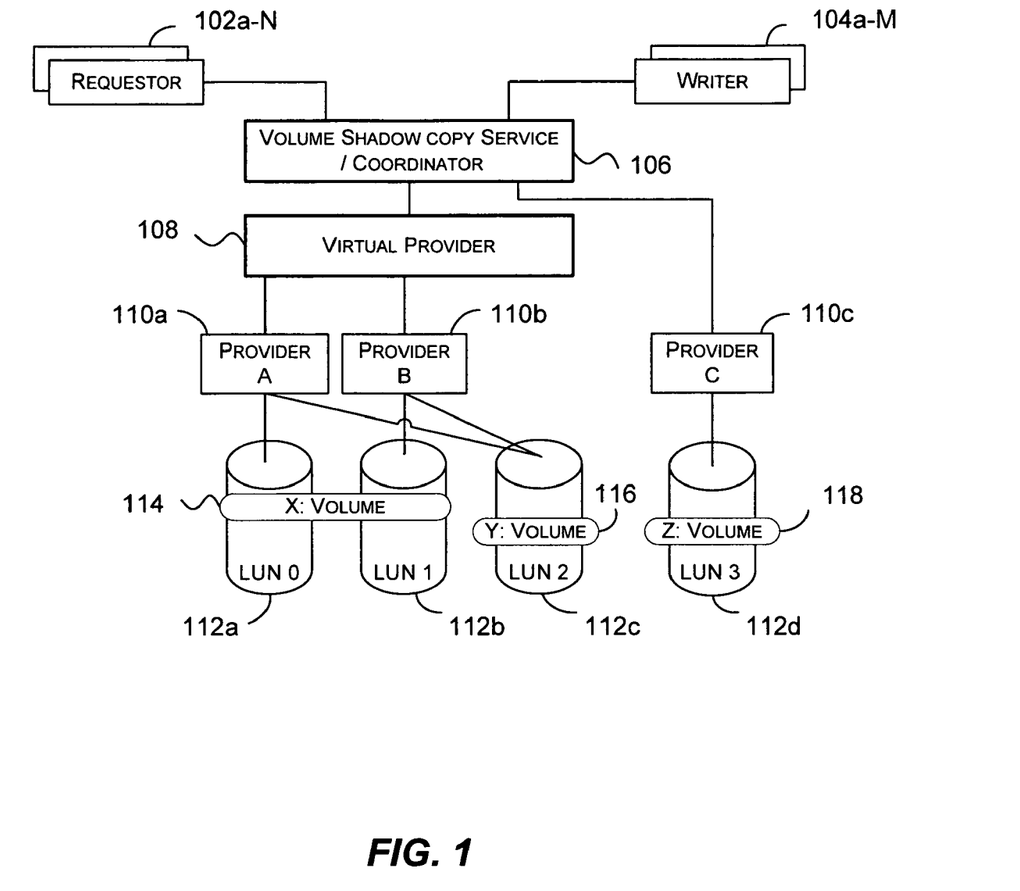
FIG. 1 is a block diagram illustrating an exemplary environment having a virtual provider supporting shadow copy functionality in accordance with exemplary embodiments.

FIG. 1 shows an exemplary system 100 having shadow copy functionality in accordance with exemplary embodiments. A series of requestors 102*a*-N and writers 104*a*-M interact with a shadow copy service coordinator 106. A virtual provider module 108 communicates with the copy service coordinator 106 and a plurality of providers 110*a, b*, which interact with a number of logical units (LUNs) 112*a-c*. A first volume 114 (volume X) spans first and second LUNs 112*a, b* and a second volume 116 (volume Y) resides on the third LUN 112*c*. The coordinator 106 interacts with the third provider 110*c* (provider C) directly, as described more fully below. The third provider 110*c* interacts with the fourth LUN 112*d*, on which the third volume 118 (volume Z) is located.

In the illustrated embodiment, the first provider 110*a* (provider A) interacts with the first LUN 112*a* and the third LUN 112*c*. The second provider 110*b* (provider B) interacts with the second and third LUNs 112*b, c*. As can be seen, the first volume 114 (volume X) spans the first and second LUNs 112*a, b*. As noted above, the first LUN 112*a* is supported by the first provider 110*a* and the second LUN 112*b* is supported by the second provider 110*b*. That is, the first volume 114 is located on LUNs that are supported by different providers 110*a, b*. The second volume 116 (volume Y) is located on the third LUN 112*c*, which are supported by both the first and second providers 110*a, b*. When creating a shadow copy of the second volume 116 (Volume Y), a selection mechanism can be used by the virtual provider 108 to select an optimal provider (A or B) for the third LUN 112*c*, as described more fully below.

In general, a requester 102 is an application that initiates the shadow copy creation (backup) process. In addition, the requestor application 102 can initiate other tasks such as importing a shadow copy to a backup server, querying, deleting, and restoring the shadow copy. A requestor 102 can also communicate with writers 104 directly to gather information regarding shadow copy creation and usage. Examples of requesters 102 include Networker, RM and RMISE applications by EMC Corporation, which are well known to those of ordinary skill in the art.

A writer 104 is a part of an application or operating system service that ensures the consistency of a shadow copy. A writer 104 also contains information about what to backup and how to restore. It can directly communicate this information to a requestor 102 for more granular control of the backup and/or restore process.

During the shadow copy creation (backup) process, the writer 104 freezes the application or service's I/O activities for a brief period of time to guarantee the shadow copy's point-in-timeness. During the restore process, the writer 104 can also be involved to provide guidance on how, what and where to restore the shadow copy, and to avoid data inconsistency. Examples of writers include the Microsoft Exchange 2003 Writer, the SQL 2000 Writer, and the Registry and Event Log Writers that are part of Windows Server 2003.

A provider 110 is the component that creates the point-in-time copy, or shadow copy, of the production data. The provider 110 then maintains the shadow copy over its life cycle.

Normally, a provider 110 can be a part of an application; alternatively, it can be run as a service. If a provider 110 interacts with storage array hardware, the provider is considered to be hardware-based. Otherwise, the provider is considered to be software-based. One software-based provider is the System Provider, which is supplied as part of the Windows Server 2003.

In the conventional VSS framework, the hierarchy for provider selection is in the following order: 1) hardware provider, 2) software provider, and 3) system provider. However, it lacks provider selection and management functionality, as described more fully below. Examples of hardware providers include EMC Symmetrix VSS Provider, EMC CLARiiON VSS Provider, and RM/SE's private VSS Provider.

The shadow copy coordinator 106 provides the overall control and coordination among the components described above in the process of creating and managing shadow copies. In the existing VSS framework, the coordinator is provided as the VSS coordinator of the WINDOWS operating system service. The coordinator 106 prohibits direct communications: a) between a requestor 102 and a provider 110, and b) between a writer 104 and a provider 110. Communications are routed through the coordinator 106, except that direct communications between a requester 102 and a writer 104 are allowed.

An exemplary embodiment includes a virtual provider 108 that abstracts interaction with the various providers 110 (e.g., providers A, B, and C) to enhance the user experience when creating and managing shadow copies. The virtual provider 108 is located between the providers 110 and the coordinator 106 to manage and overcome certain limitations in conventional frameworks.

In one embodiment, the virtual provider 108 supports volume snapshots having LUNs not supported by only one provider. For example, the first volume 114 (volume X) spans the first and second LUNs 112*a, b*. However, the first provider 110*a* (provider A) supports only the first LUNs 112*a*. The second provider 110*b* (provider B) supports the second LUN 112*b*. The virtual provider 108 facilitates the creation and management of the first volume 114 across multiple LUNs 112*a, b* having different providers.

Without the virtual provider 108, the coordinator 106 would be unable to create a shadow copy for the first volume 114 since the coordinator 106 does not allow multiple providers per volume.

Without the virtual provider 108, the coordinator 106 may attempt to process an access request for the first volume 114, which is located on the first and second LUNs 112*a, b*, by first interacting with the first provider 110*a* and then discovering that the first provider 110*a* does not support access to the second LUN 112*b*, which is supported by the second provider 110*b* (provider B). Alternatively, the user would have to ensure that all LUNs in a volume are supported by the same hardware or software provider, which is an undesirable burden on the user.

The virtual provider 108 implements the required shadow copy interfaces while appearing as a typical provider 110 to the coordinator 106, which communicates directly with the virtual provider 108. At the same time, the virtual provider 108 manages one or more physical providers 110 underneath it.

The virtual provider 108 maintains sufficient state information and invokes one or more physical providers 110 under its control to take a shadow copy for a volume. Meanwhile, the virtual provider 108 interacts with the coordinator 106 as a single provider, and thus, satisfies the single provider per volume requirement of conventional frameworks, such as the Microsoft VSS framework.

In general, the virtual provider 108 intelligently manages hardware and software providers under its control, by supplying functional flexibility and manageability and providing a unified interface to the coordinator 106. By decoupling the physical providers 110 from the coordinator 106, the virtual provider 108 facilitates the addition of new features to providers under its management.

In one embodiment, the virtual provider 108 exposes a user interface element, e.g. GUI (graphical user interface) or CLI (command line interface) or both, that allows users to specify operational preferences and policies. Alternatively, the virtual provider 108 can use statistical information to aid in the decision making process. In one embodiment, the virtual provider 108 includes a provider selection mechanism for implementing user policies to select the optimal provider.

The virtual provider 108 can have a statistics module to keep track of various provider performance metrics, such as success versus failure statistics. The history and statistical information can also be used by the provider selection mechanism to select providers in various circumstances to ensure the best performance and success rate. Additionally, state information for the virtual provider 108 can include preferred requestor-provider pairs, for example.

For example, if the first requestor 102a requests access to the second volume 116, which resides on the third LUN 112c, the virtual provider 108 invokes the selection mechanism to select the best provider, either 110a or b (provider A or B) for this request.

If multiple physical providers are equally capable, then the virtual provider 108 selects the most successful and/or fastest provider 110 for the request. It should be noted that all physical providers do not necessarily respond to every requester 102. The virtual provider 108 functions as a 'normal' provider to the coordinator 106 and requestor 102. Due to the presence of the virtual provider, the requestor 102 and/or coordinator 106 do not necessarily need to know or care about the implementation details of the physical providers. And the requestor/coordinator may not care about which physical provider 110 actually fulfills the request.

Without the virtual provider 108, in the case where there exist multiple hardware providers each capable of supporting a given set of LUNs, the behavior of the coordinator 106 may be inconsistent and/or indeterministic. The unpredictability of the provider selection can lead to erratic performance and functionality, and/or operation failures due to provider mismatch.

As mentioned previously, conventional frameworks mandate that any provider must respond to every requestor 102. However, there may exist so-called private or protected providers having superior performance and functionality that only respond to a predefined set of requestors. The enforcement of such a framework mandate deems those providers unqualified and unusable. On the other hand, the virtual provider 108 responds to any requester 102. It accepts the request from a requestor 102 via coordinator 106 and then forwards the request to a physical provider 110 that is capable of handling such a request, which may be a private or protected provider. The virtual provider 108 can bridge the gap by accepting requests from any requester 102 and forwarding those requests to appropriate providers including private providers under management. Therefore, the virtual provider 108 protects the development investment since private providers can still be used.

With regard to the third provider 110c, this provider directly communicates with the coordinator 106, as prescribed by the existing VSS framework. Thus, the virtual provider can co-exist with conventional frameworks.

Figure 2A:
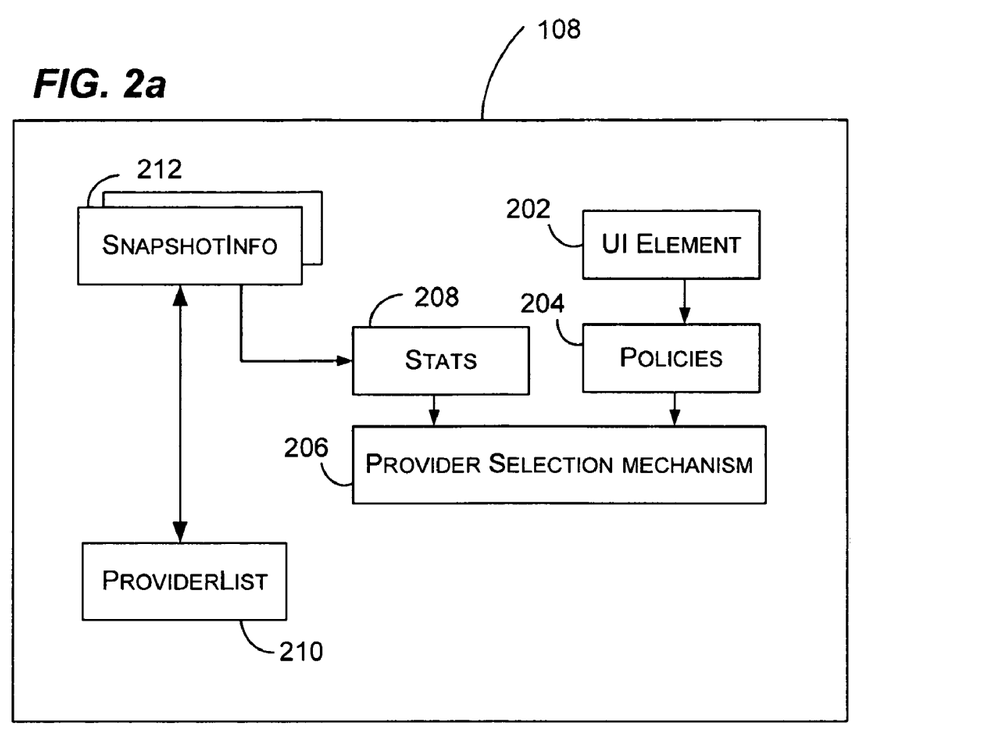
FIG. 2a is a block diagram representing a more detailed view of exemplary components of the virtual provider in accordance with exemplary embodiments.

FIG. 2a shows further details for an exemplary implementation of the virtual provider 108 of FIG. 1. A user interface element 202 allows a user to specify policies, preferences, and/or rules 204 that can be used in a provider selection mechanism 206. For example, a policy could be that for a given requestor, a given physical provider should be used if possible. Further, a policy can favor vendor affinity, e.g., attempt to pair together the requestor and provider, or provider and array (LUNs) made by the same vendor. This would assume that the components made by same vendor would have better interoperability.

A statistics component 208 can maintain a database of various performance metrics, such as success and failure rate, performance, frequency of use, etc., for each physical provider under management. A provider list 210 keeps track of the physical providers under management. The list can be maintained in various formats well known to one of ordinary skill in the art, such as a double linked list or other data structure. A snapshot information module 212 maintains snapshot information, as described more fully below.

The provider selection mechanism 206 uses information from the policies 204 component and the statistics module 208 to intelligently select the optimal provider to perform a given task. When user policies are specified, such policies will take precedence.

Figure 2B:
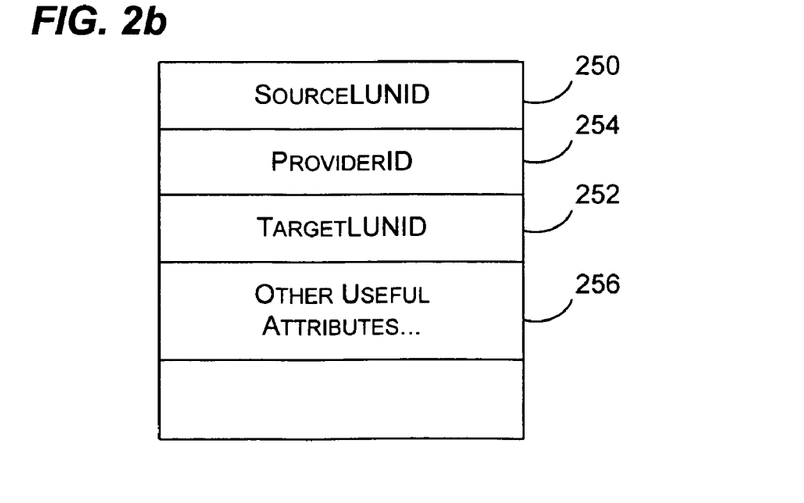
FIG. 2b is a block diagram representing a more detailed view of exemplary fields of a snapshot information data structure in accordance with exemplary embodiments.

FIG. 2b shows additional detail for an exemplary implementation of the snapshot information module 212 of FIG. 2a. For each source LUN 250, the virtual provider 108 (FIG. 1) maps a target LUN 252 and a provider 254, which can interact with the appropriate storage array and perform the desired task. The snapshot information component 212 can have other useful attributes or information 256 with respect to snapshots, source and target LUNs, physical providers, and so on.

Figure 3:
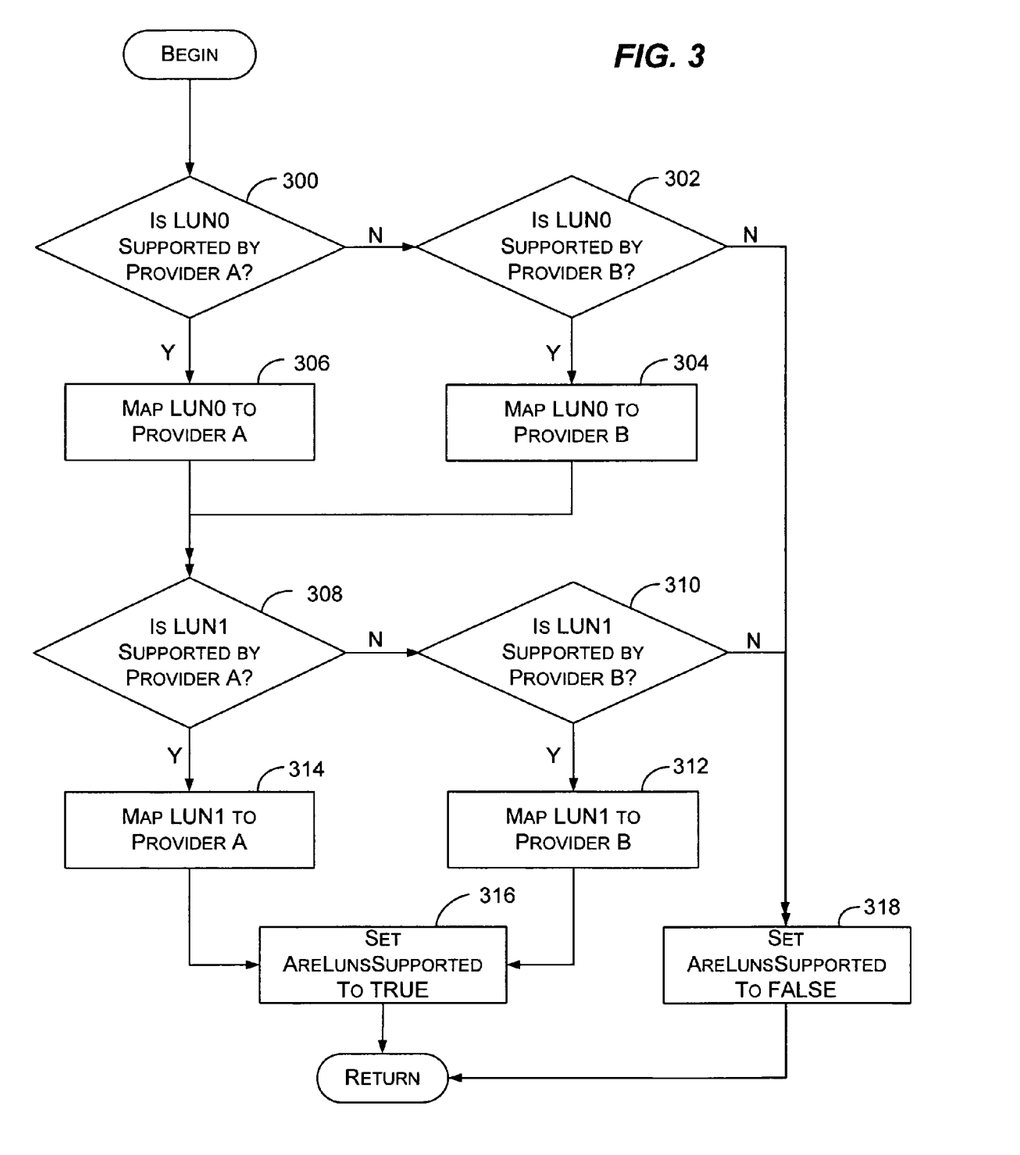
FIG. 3 is a flow diagram that generally represents exemplary steps determining whether LUNs are supported that may be executed by a virtual provider in accordance with exemplary embodiments.

FIG. 3 shows a set of exemplary sequences of steps to implement a system having a virtual provider in accordance with exemplary embodiments. In general, it is determined whether a provider can support all of the LUNs contributing to a given volume. In some conventional frameworks, such as Microsoft VSS, this routine must return false if the provider does not support all the LUNs. More specifically, FIG. 3 depicts the following five exemplary scenarios supported by exemplary embodiments:

1) Both LUN0 and LUN1 are supported by Provider A. This scenario is supported by the existing VSS framework.
2) LUN0 is supported by Provider A and LUN1 is supported by Provider B. The existing VSS framework does not allow this.
3) LUN0 is supported by Provider B and LUN1 is supported by Provider A. The existing VSS framework does not allow this.
4) Both LUN0 and LUN1 are supported by Provider B. This scenario is supported by the existing VSS framework.
5) Either or both LUN0 and LUN1 is/are not supported by either Provider A or B. In this case the AreLUNSupported flag is set to false.

The exemplary sequences of steps for scenarios 1), 2) and 5) above are described below as follows. In step 300 it is determined whether LUN0 is supported by provider A. If so, in step 306 LUN0 is mapped to provider A. In step 308 it is determined whether LUN1 is supported by provider A. If so, then in step 314 LUN1 is mapped to provider A and a flag, i.e., AreLunsSupported is set to true in step 316. This is the case of scenario 1) above where both LUN0 and LUN1 are supported by provider A.

However, if in step 308 LUN1 was found not to be supported by provider A, then in step 310 it is determined whether LUN1 is supported by provider B. If so, then in step 312 LUN1 is mapped to provider B, and a flag, i.e., AreLunsSupported is set to true in step 316. This is the case for scenario 2) where LUN0 is supported by provider A and LUN1 is supported by provider B. Furthermore, if LUN1 was found not to be supported by provider B, then the flag is set to false in step 318. This falls under scenario 5) where LUN0 is supported by provider A but LUN1 is not supported by provider A or B.

It is apparent that exemplary sequences of steps for scenarios three and four can be constructed in the same fashion, with the aid of FIG. 3, however, those steps are omitted herein for brevity. As noted above, exemplary embodiments support the first four scenarios above, where the existing VSS framework only supports scenarios one and four.

By using the virtual provider 108 (FIG. 1), one can overcome a one-provider per volume limitation of known frameworks. For instance, the virtual provider 108 can use provider A to support LUN0, and provider B to support LUN1. To the coordinator 106, the virtual provider 108 acts as one provider that can support both LUN0 and LUN1.

Figure 4:
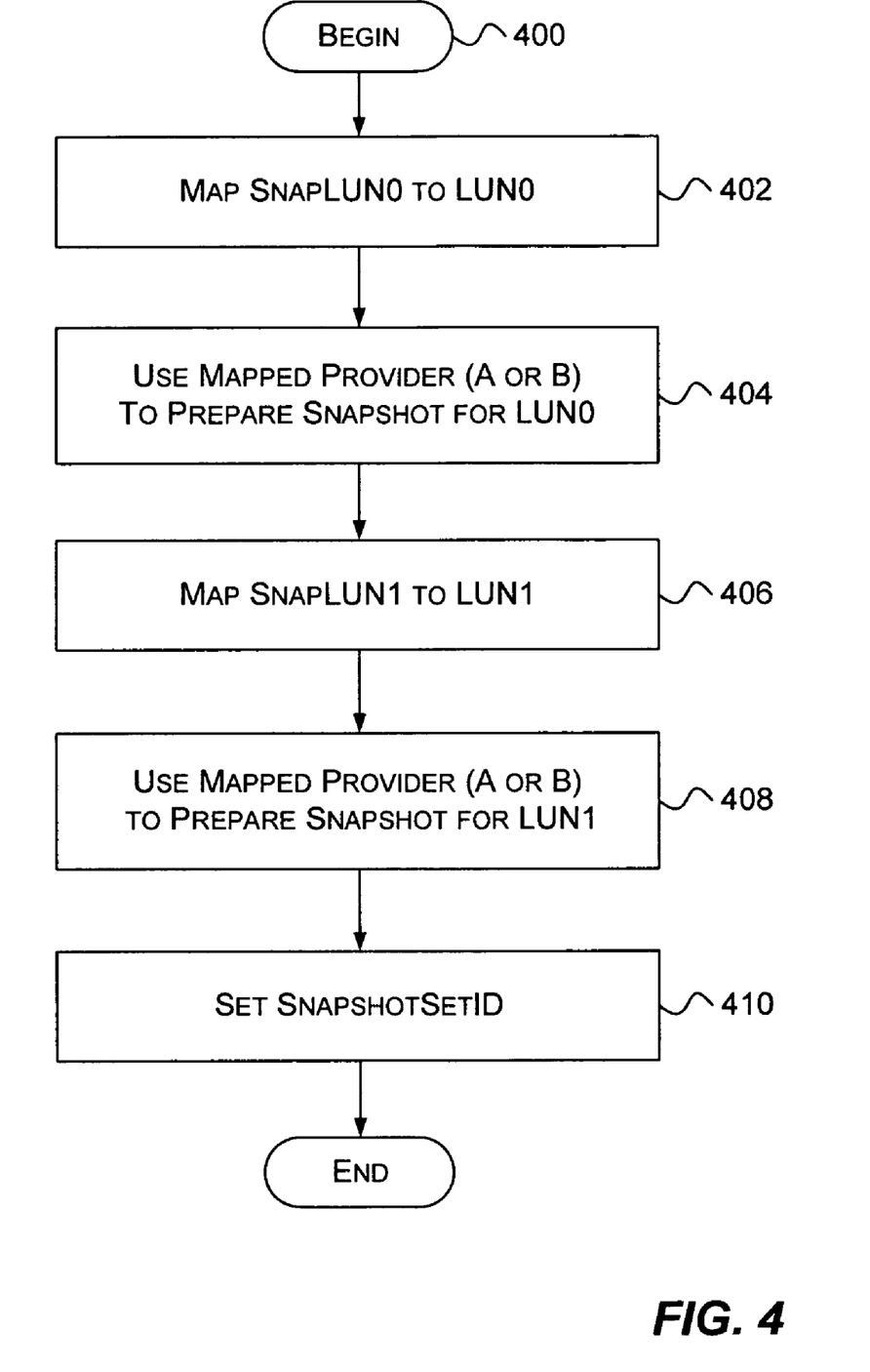
FIG. 4 is a flow diagram that generally represents exemplary steps to implement a begin to prepare snapshot API call that may be performed by a virtual provider in accordance with exemplary embodiments.

FIG. 4 is a dataflow diagram that generally represents exemplary steps for preparing a snapshot, i.e., BeginPrepareSnapshot call, for a virtual provider in accordance with exemplary embodiments. The coordinator 106 (FIG. 1) forwards the call to the virtual provider 108 and the virtual provider 108 calls physical providers to inform them to prepare related LUNs for the snapshot operation. Time consuming tasks, such as synchronizing the target LUN with the source LUN, can be performed during this call.

At step 400, the coordinator calls the virtual provider to initiate BeginPrepareSnapshot. At step 402, the virtual provider maps a target LUN (SnapLUN0) to the source LUN (LUN0). This is performed with the aid of the mapped provider, such as provider A or B. At step 404, the virtual provider uses the mapped provider (either A or B) to prepare a snapshot for source LUN (LUN0). In step 406, the virtual provider maps a further target LUN (SnapLUN1) to a source LUN (LUN1). And in step 408, the virtual provider uses the mapped provider (A or B) to prepare a snapshot for the target LUN (LUN1).

It is understood that this process can be repeated for additional LUNs and further volumes. At step 410, the virtual provider sets the SnapshotSetID, which is passed in by the coordinator. The SnapshotSetID uniquely identifies this particular snapshot set.

Figure 5:
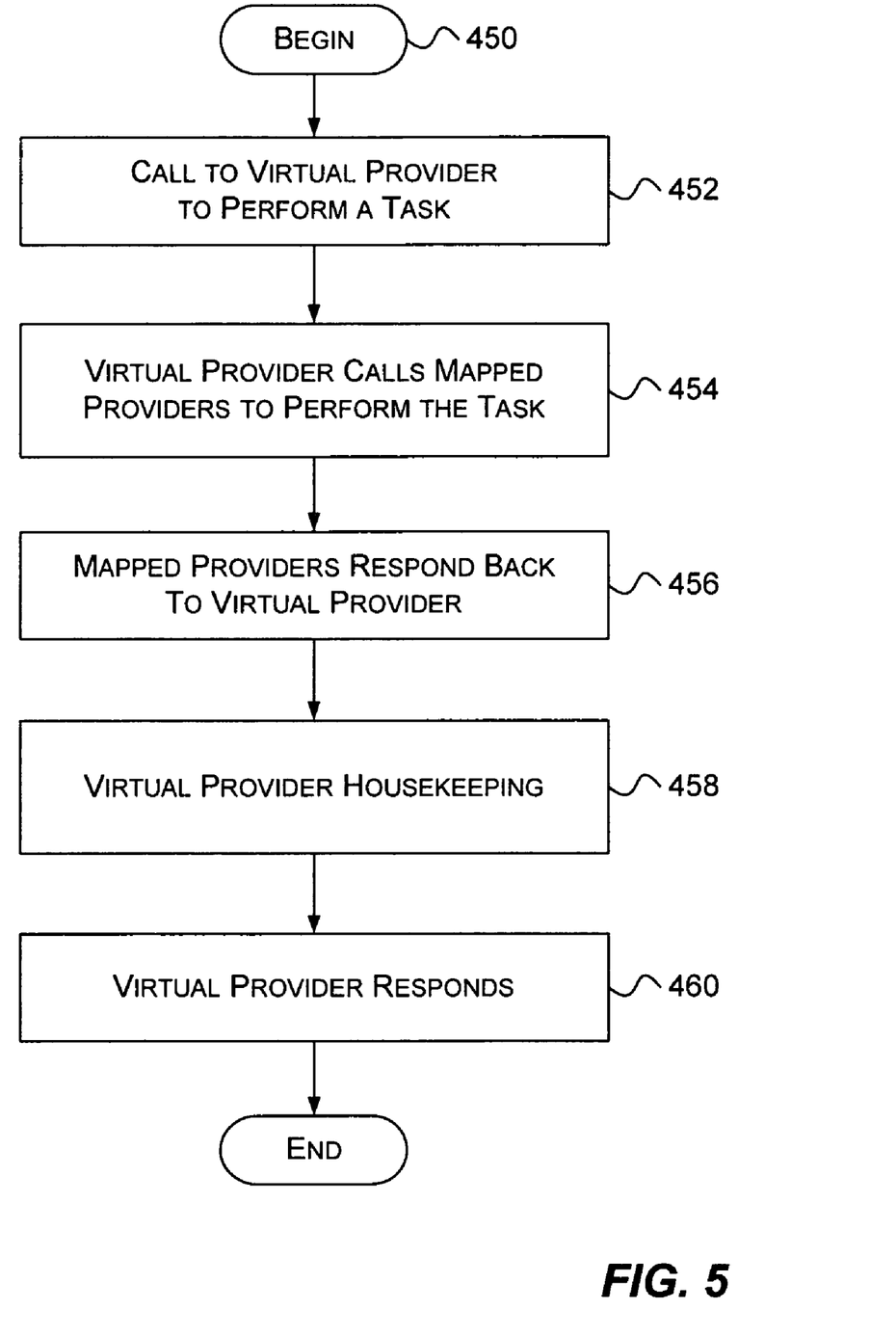
FIG. 5 is a flow diagram that generally represents exemplary steps of calls that may be handled by a virtual provider and physical providers under management in accordance with exemplary embodiments.

FIG. 5 is a flow diagram showing an exemplary implementation of further VSS calls (e.g. end prepare snapshots, commit snapshots, get target LUNs, etc.) that may occur in a system having a virtual provider in accordance with exemplary embodiments. In step 450, processing begins and in step 452 there is a call by the coordinator to the virtual provider to perform a task, e.g., commit snapshot. In step 454, the virtual provider calls the mapped providers to perform the task and in step 456 the mapped providers perform the task and respond to the virtual provider. In step 458, the virtual provider performs some housekeeping and in step 460 the virtual provider responds to the coordinator.

Figure 6:
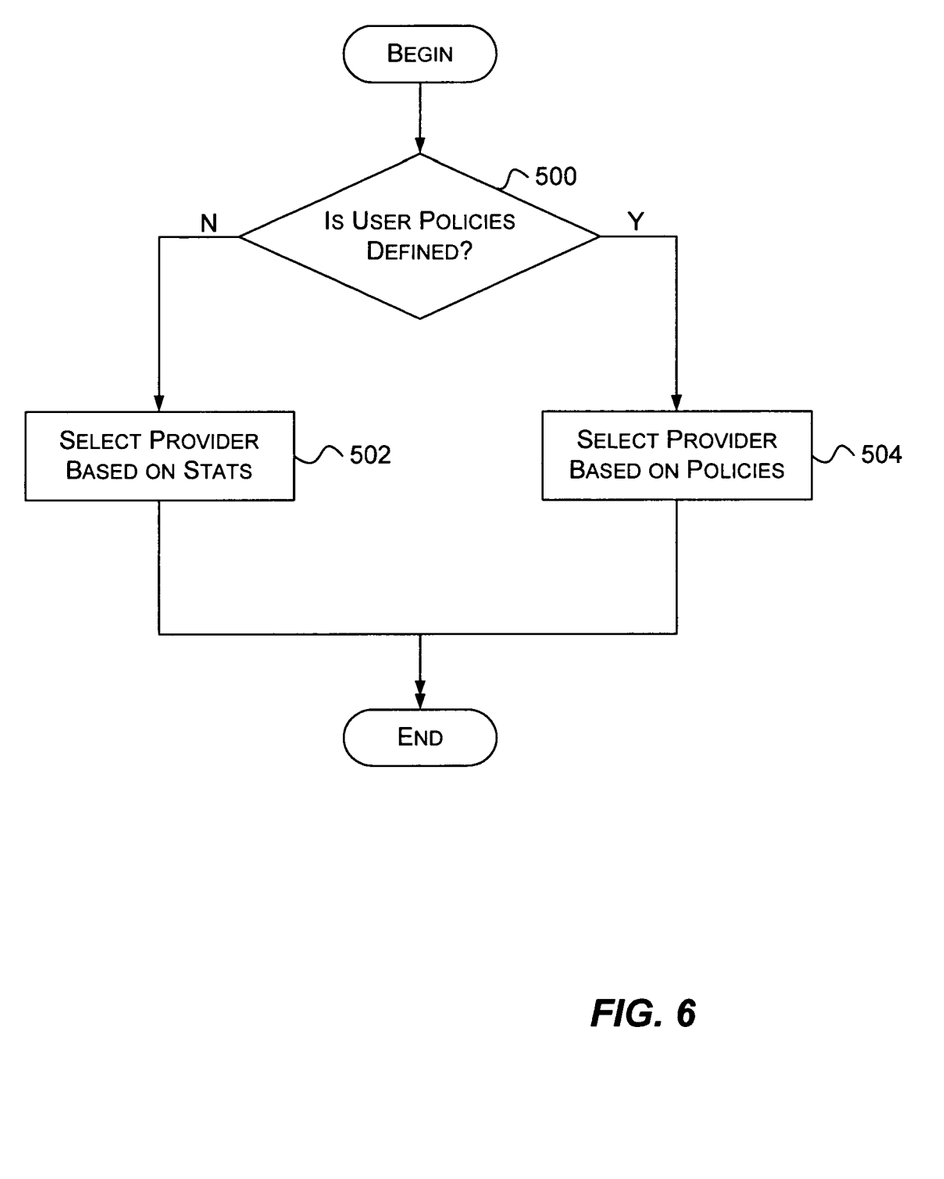
FIG. 6 is a flow diagram that generally represents exemplary steps to implement provider selection in a virtual provider in accordance with exemplary embodiments.

FIG. 6 is a flow diagram showing an exemplary sequence of steps to implement provider selection in accordance with exemplary embodiments. In step 500, it is determined whether there are any user-defined policies for provider selection for a given task, e.g., take snapshot. If not, in step 502, the provider is selected based on statistics, which can be stored in the statistics module 208 (FIG. 2a) of the virtual provider. In general, where multiple providers are capable of performing the task, the provider selection mechanism selects the provider that is more likely to be successful and/or faster.

If it was determined in step 500 that user policies are defined, then in step 504, provider selection is performed based on the user policies. For example, components by the same vendor may be selected. It is understood that this selection mechanism is not limited to user policies and/or statistics. In another embodiment, after applying user policies in step 504, step 502 can be expanded to further refine the selection using statistics and historical information.

In one embodiment, a configuration wizard allows a user to select from a list the physical providers that should be managed by the virtual provider. Alternatively, the virtual provider can automatically discover, register and manage installed physical providers. The virtual provider can discover installed physical providers and register and manage those physical providers that are made by a given vendor or a set of vendors.

It is understood that the exemplary embodiments described herein are applicable to a wide variety of systems having the ability to store and manage data. An exemplary data storage management system that can include a virtual provider is the EMC Information Replication (IR) system in which an IR Application client has shadow copy functionality. The EMC Information Replication system is shown and described in U.S. Patent Publication No. US2003/005120 A1 by Mutalik et al, entitled Information Replication System Having Enhanced Error Detection And Recovery, and incorporated herein by reference.

Figure 7:
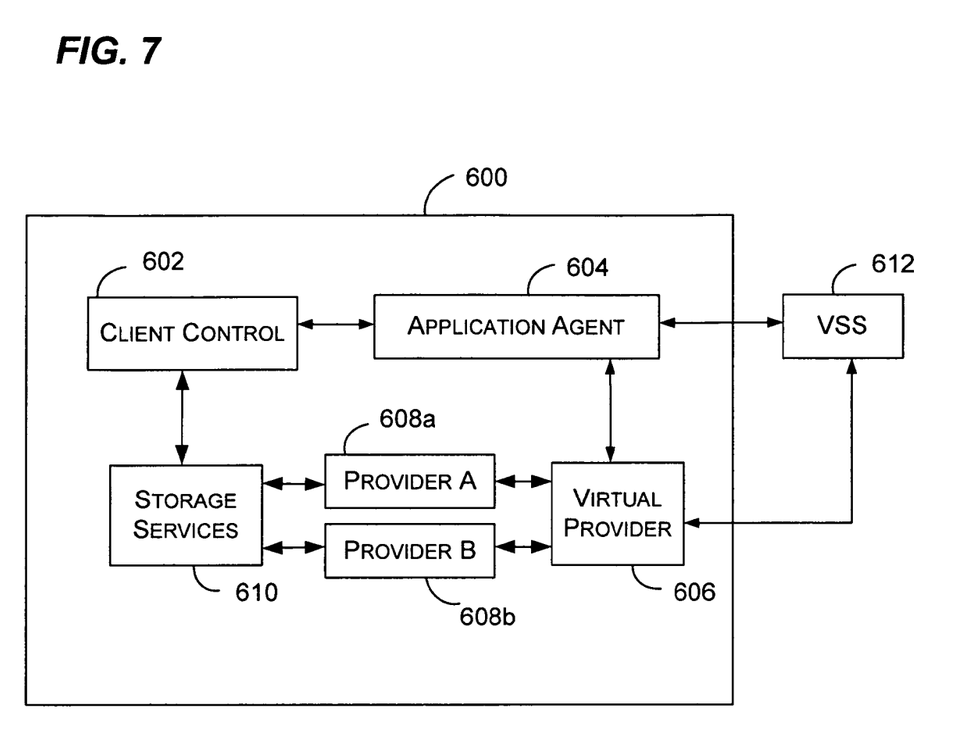
FIG. 7 is a high level block diagram of an application client of an exemplary information replication system having a virtual provider to support shadow copy operations in accordance with exemplary embodiments.

FIG. 7 is a high-level block diagram of an exemplary IR Application Client of the Information Replication system of U.S. Patent Publication. No. US2003/005120 A1 having a virtual provider to support shadow copy operations in accordance with exemplary embodiments. The IR Application Client 600 is generally described in FIG. 1 of Patent Publication. No. US2003/005120 A1. The client control module 602 interfaces with the server module of information replication system 600 (not shown) and the storage services module 610, which interfaces with the storage arrays (not shown) via SAN (storage array network) or other inter-connect mechanisms, such as Fibre Channel, SCSI or iSCSI (Internet small computer system interface). The client control module 602 also communicates with the application agent 604, which in turn communicates with the virtual provider 606. The virtual provider 606 manages a plurality of physical providers 608a, b, which communicate with the storage services module 610 to access LUNs and information about LUNs resident in the storage arrays. Both the application agent 604 and the virtual provider 606 communicate with the Volume Shadow copy Service (VSS) 612, to make shadow copies of production data.

In the above detailed description of exemplary embodiments, reference is made to the accompanied drawings, which form a part hereof, and which are shown by way of illustration, specific exemplary embodiments. It is to be understood that other embodiments can be utilized, and other changes can be made, without departing from the spirit or scope of the illustrative embodiments shown and described herein. The above detailed description is, therefore, not to be taken in a limiting sense.

What is claimed is:

1. A method, comprising:
    receiving a request from a requestor coupled to a coordinator to create a shadow copy of a data volume on first and second logical units, where the first logical unit is supported by a first provider and the second logical unit is supported by a second provider; and
    creating the shadow copy by a virtual provider coupled to the first and second providers and to the coordinator, wherein the virtual provider appears as a provider to the coordinator.

2. The method according to claim 1, wherein the second logical unit is not supported by the first provider.

3. The method according to claim 1, further including a writer communicating with the requestor regarding the shadow copy.

4. The method according to claim 1, wherein the first provider is a hardware provider.

5. The method according to claim 1, wherein the second provider is a software provider.

6. The method according to claim 1, wherein the first and second providers both support the first and second logical units and further including selecting a first one of the first and second providers using a selection mechanism.

7. The method according to claim 6, wherein the selection mechanism includes user policies.

8. The method according to claim 7, wherein the user policies include one or more of functionality, speed, vender commonality, or failure rate.

9. The method according to claim 6, wherein the selection mechanism includes statistical and/or historical information.

10. The method according to claim 1, wherein the virtual provider responds to all requestors.

11. The method according to claim 10, wherein the virtual provider services a request by selecting a private provider and forwarding the request to the private provider.

12. A data storage system, comprising:
    a memory having stored instructions to provide:
        a virtual provider for interacting with a coordinator to receive shadow copy requests from a requestor and for interfacing with a plurality of providers that support various logical units on which data volumes can be stored,
    wherein the virtual provider appears to the coordinator as a provider and can generate a shadow copy of a first one of the data volumes that spans first and second logical units, the first logical unit being supported by a first provider and the second logical unit being supported by a second provider.

13. The system according to claim 12, wherein the second logical unit is not supported by the first provider.

14. The system according to claim 12, wherein the first provider is a hardware provider.

15. The system according to claim 13, wherein the first and second providers both support the first and second logical units and further including a selection mechanism to select a first one of the first and second providers.

16. The system according to claim 15 wherein the selection mechanism includes user policy information and statistical and/or historical information.

17. An article, comprising:
    a storage medium having stored instructions that when executed by a machine result in the following:
    receiving a request from a requestor coupled to a coordinator to create a shadow copy of a data volume on first and second logical units, where the first logical unit is supported by a first provider and the second logical unit is supported by a second provider; and
    creating the shadow copy by a virtual provider coupled to the first and second providers and to the coordinator, wherein the virtual provider appears as a provider to the coordinator.

18. The article according to claim 17, wherein the second logical unit is not supported by the first provider.

19. The article according to claim 17, wherein the first and second providers both support the first and second logical units and further including instructions to select a first one of the first and second providers.

20. The article according to claim 19, wherein the selecting instructions include user policies.

* * * * *